(12) United States Patent
Cui et al.

(10) Patent No.: US 9,109,949 B2
(45) Date of Patent: Aug. 18, 2015

(54) NEAR-FIELD OPTICAL SENSING SYSTEM

(71) Applicant: QUALCOMM MEMS Technologies, Inc., San Diego, CA (US)

(72) Inventors: Xiquan Cui, San Jose, CA (US); Muhammed I Sezan, San Jose, CA (US); Russell Wayne Gruhlke, Milpitas, CA (US); Qiang Zhang, Tempe, AZ (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 132 days.

(21) Appl. No.: 13/829,009

(22) Filed: Mar. 14, 2013

(65) Prior Publication Data
US 2014/0264034 A1    Sep. 18, 2014

(51) Int. Cl.
| | | |
|---|---|---|
| *G01J 5/08* | (2006.01) | |
| *G02B 6/00* | (2006.01) | |
| *G06F 3/041* | (2006.01) | |
| *G06F 3/042* | (2006.01) | |
| *F21V 8/00* | (2006.01) | |

(52) U.S. Cl.
CPC .............. *G01J 5/0818* (2013.01); *G06F 3/0416* (2013.01); *G06F 3/0428* (2013.01); *G02B 6/0036* (2013.01); *G02B 6/0076* (2013.01); *G06F 2203/04108* (2013.01); *G06F 2203/04109* (2013.01)

(58) Field of Classification Search
CPC ................ G01J 5/0818; G02B 6/0036; G06F 2203/04108; G06F 3/0416; G06F 3/0428
USPC ............................ 250/338.1, 338.4, 340, 353
See application file for complete search history.

(56) References Cited

U.S. PATENT DOCUMENTS

| | | | |
|---|---|---|---|
| 6,141,104 A | 10/2000 | Schulz et al. | |
| 7,465,914 B2 | 12/2008 | Eliasson et al. | |
| 2010/0187422 A1* | 7/2010 | Kothari et al. ................ 250/353 |
| 2010/0302209 A1 | 12/2010 | Large | |
| 2011/0148818 A1 | 6/2011 | Jhu et al. | |
| 2012/0229422 A1 | 9/2012 | Hwang et al. | |

FOREIGN PATENT DOCUMENTS

| | | |
|---|---|---|
| JP | H0243501 A | 2/1990 |
| WO | WO-2013003201 A1 | 1/2013 |

OTHER PUBLICATIONS

International Search Report and Written Opinion—PCT/US2014/021048—ISA/EPO—Jun. 27, 2014.

* cited by examiner

*Primary Examiner* — Mark R Gaworecki
(74) *Attorney, Agent, or Firm* — Knobbe Martens Olson & Bear LLP

(57) ABSTRACT

This disclosure provides systems, methods and apparatus, including computer programs encoded on computer storage media, for sensing touch and/or gestures in the near-field area overlying a light-guiding layer within a device or other optical sensing system. In one aspect, modulated infrared light is emitted into the overlying area, and the light reflected by objects within the overlying area is redirected through the light-guiding layer to infrared sensors. In one aspect, a masking structure can be located between the light-guiding layer and the infrared sensors. In some aspects, probability mapping or backtracing can be used to estimate the locations of objects within the overlying area.

30 Claims, 12 Drawing Sheets

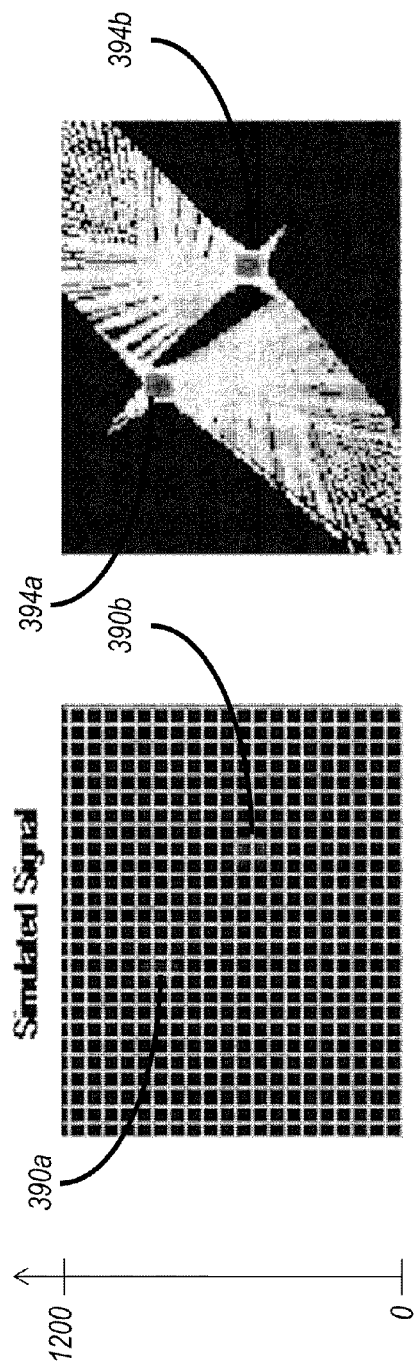
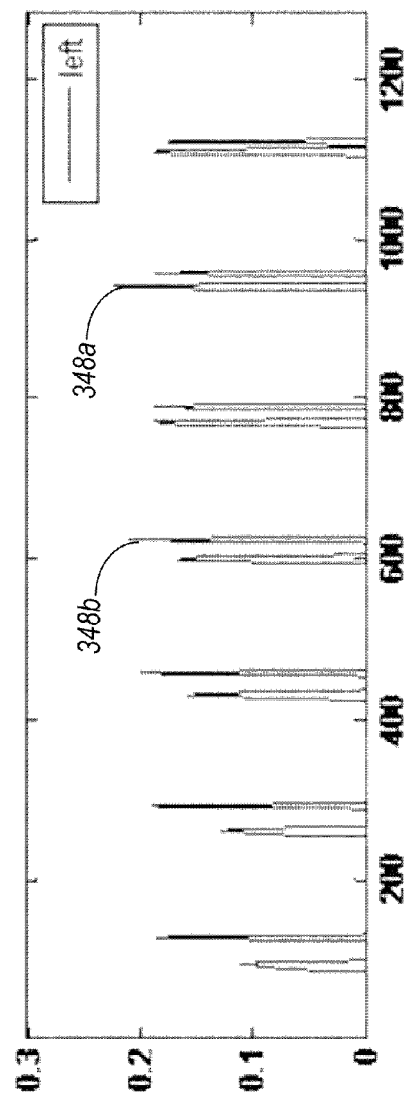
FIG. 7A
FIG. 7B
FIG. 7C

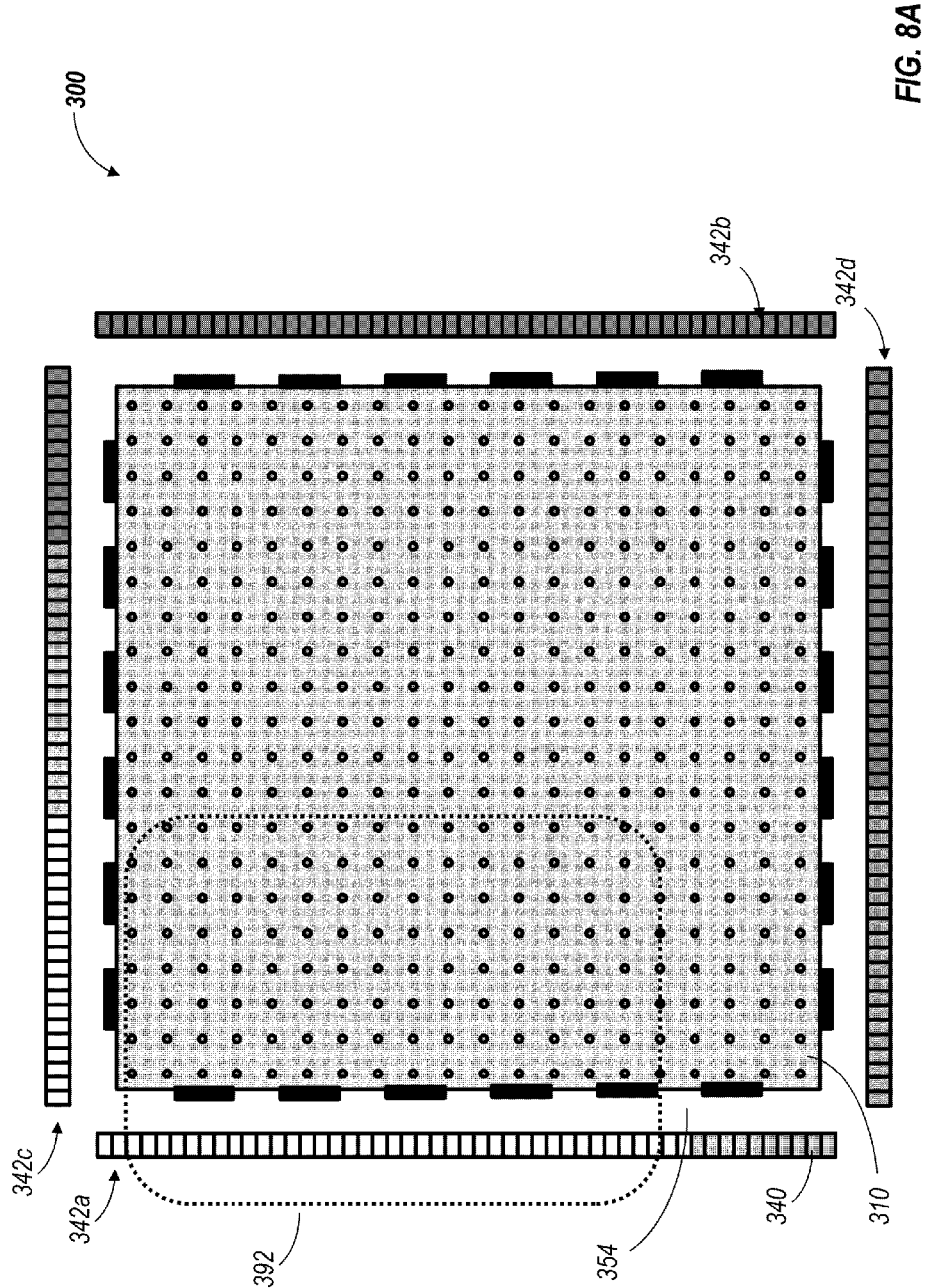

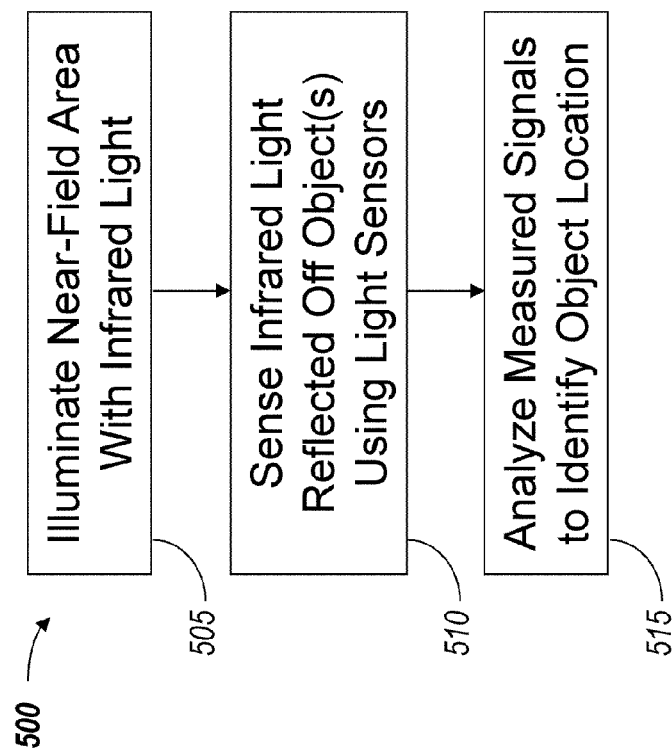

NEAR-FIELD OPTICAL SENSING SYSTEM

TECHNICAL FIELD

This disclosure relates to optical sensors, and in particular optical touch and gesture sensing devices which can be used alone or in conjunction with electromechanical systems and devices.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

Touchscreens and gesture sensing systems can be used to provide input to an underlying display device or to any other devices. Some touchscreens rely on projected capacitive technology (PCT), which requires direct interaction with a surface and may require skin to surface contact or other specific materials in order to interact with the PCT touchscreen. Similarly, some gesture recognition systems rely on the use of a camera which senses visible light, and the efficacy of such a system may be constrained by the capability of the camera.

SUMMARY

The systems, methods and devices of this disclosure each have several innovative aspects, no single one of which is solely responsible for the desirable attributes disclosed herein.

One innovative aspect of the subject matter described in this disclosure can be implemented in an optical sensing system, comprising a light guiding layer having a first surface, a second surface, and one or more edges; an infrared (IR) light source configured to direct light into an area overlying the first surface of the light guiding layer; a plurality of light-turning structures configured to redirect light passing through the first surface of the light guiding layer into the light-guiding layer; a plurality of IR sensors adjacent at least one edge of the light-guiding layer; and a plurality of masking structures disposed between the light-guiding layer and the plurality of IR sensors.

In some implementations, the system can include a processor in electrical communication with the plurality of IR sensors, wherein the processor is configured to analyze signals measured by the plurality of IR sensors to identify a location of an object within the area overlying the first surface of the light guiding layer. In some implementations, the IR light source can be configured to modulate the light directed into the area overlying the first surface of the light guiding layer. In some implementations, the IR light source can be disposed on the same side of the light guiding layer as the second surface, and can be configured to direct light through the light guiding layer.

In some implementations, the IR light source can be in optical communication with a second light-guiding layer extending substantially parallel to the first light guiding layer, and the second light-guiding layer can include a plurality of light-turning structures configured to redirect light emitted by the IR light source into the second light-guiding layer into the area overlying the first surface of the first light guiding layer. In some implementations, the plurality of IR sensors can include linear arrays of IR photodiodes extending adjacent each edge of the light-guiding layer. In some implementations, the plurality of light-turning structures can include reflective facets extending through or adjacent the second surface of the light-guiding layer. In some implementations, the plurality of masking structures can include a periodic array of masking structures extending adjacent each edge of the light-guiding layer.

In some implementations, the system can additionally include a display located on the same side of the light guiding layer as the second surface. In at least a first further implementation, the system can additionally include a backlight disposed on the opposite side of the display as the light-guiding layer, wherein the backlight includes the IR light source. In some still further implementations, the display can include a liquid crystal display. In at least a second further implementation, the display can include a transmissive display. In at least a third further implementation, the display can include a transflective display. In at least a fourth further implementation, the display can include includes a reflective display. In some still further implementations, the system can additionally include a frontlight system configured to illuminate the display, wherein the frontlight system includes the IR light source. In other still further implementations, the display can include an array of interferometric modulators. In at least a fifth further implementation, the system can include a processor that is configured to communicate with the display, the processor being configured to process image data; and a memory device that is configured to communicate with the processor. In at least a first still further implementation, the system can additionally include a driver circuit configured to send at least one signal to the display; and a controller configured to send at least a portion of the image data to the driver circuit. In at least a second still further implementation, the system can additionally include an image source module configured to send the image data to the processor, wherein the image source module comprises at least one of a receiver, transceiver, and transmitter. In at least a third still further implementation, the system can additionally include an input device configured to receive input data and to communicate the input data to the processor.

Another innovative aspect of the subject matter described in this disclosure can be implemented in an optical sensing system, comprising a light guiding layer having a first surface, a second surface, and one or more edges; means for illuminating an area overlying the first surface of the light guiding layer with infrared (IR) light; a plurality of light-turning structures configured to redirect light passing through the first surface of the light guiding layer into the light-guiding layer; a plurality of IR sensors adjacent at least one edge of the light-guiding layer; and a plurality of masking structures disposed between the light-guiding layer and the plurality of IR sensors.

In some implementations, the system can additionally include a processor in electrical communication with the plurality of IR sensors, wherein the processor is configured to analyze signals measured by the plurality of IR sensors to identify a location of an object within the area overlying the first surface of the light guiding layer. In some implementations, the illumination means can include a modulated IR light source. In some implementations, the illumination means can include an IR light source disposed on the same side of the light guiding layer as the second surface, wherein the IR light source is configured to direct light through the light guiding layer. In some implementations, the illumination means can include a second light-guiding layer extending substantially parallel to the first light guiding layer; and at least one IR light source in optical communication with the second light-guiding layer, wherein the second light-guiding layer includes a plurality of light-turning structures configured to redirect light emitted by the at least one IR source into the area overlying the first surface of the first light guiding layer.

Another innovative aspect of the subject matter described in this disclosure can be implemented in a method of sensing one or more objects overlying a light-guiding layer, the method comprising illuminating an area overlying a first surface of the light-guiding layer with infrared (IR) light; redirecting IR light reflected by the one or more overlying objects into the light-guiding layer and towards a plurality of IR light sensors, wherein a masking structure is disposed between the light-guiding layer and the plurality of IR light sensors; measuring one or more signals indicative of the IR light incident upon the IR light sensors; and analyzing the measured one or more signals to estimate a location of the one or more overlying objects.

In some implementations, masking structure can include a periodic array of masking structures separated by gaps. In at least a first further implementation, analyzing the measured signals to estimate a location of the one or more overlying objects can include identifying a location of a local maximum in the measured one or more signals; and estimating a location of one of the one or more overlying objects based on a projection extending through the location of the local maximum and a center of one of the gaps. In at least a second further implementation, analyzing the measured signals to estimate a location of the one or more overlying objects can include generating a probability map of the location of one or more overlying objects. In some implementations, illuminating the area overlying a first surface of the light-guiding layer can include illuminating the area with modulated IR light.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

FIG. 7A shows an example of a simulated signal representative of two overlying objects within the near-field area of an optical sensor system.

FIG. 7B shows an example of certain light rays turned into a light-guiding layer in response to the simulated signal of FIG. 7A.

FIG. 7C shows an example of a plot indicative of light intensity along one side of the sensor system in response to the simulated signal of FIG. 7A.

FIGS. 8A and 8B show an implementation of sensing a swipe gesture.

FIG. 10 shows an example of a flow diagram illustrating a sensing method using a near-field optical sensing system.

Like reference numbers and designations in the various drawings indicate like elements.

DETAILED DESCRIPTION

Figure 1:
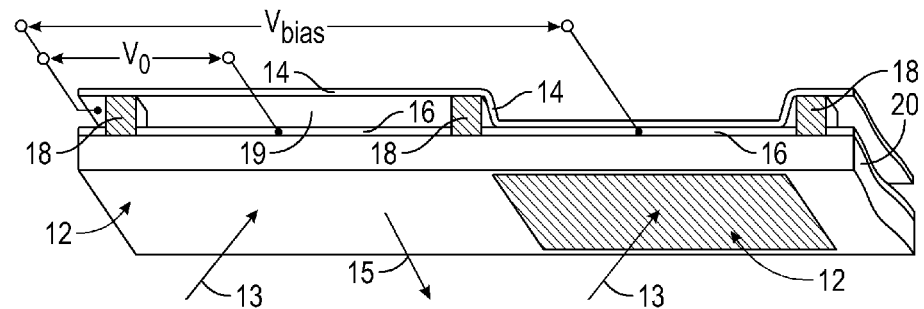
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

When a "near-field" area overlying an optical sensing system is illuminated, such as with infrared (IR) light, the IR light reflected off any objects within the near-field area can be turned towards light sensors on the periphery of the system. Measured signals from the light sensors can then be analyzed to identify the locations of overlying objects within the near-field area, serving as a touch and/or gesture sensing system. When the redirected light passes through a periodic masking structure having a known shape before reaching the light sensors, the light incident on the light sensors will be modified in a way that facilitates analysis of the measured light to identify overlying objects. In some implementations, backtracing analysis can be performed between local maximums in measured light and gaps in the masking structure to estimate locations of overlying objects, while in other implementations, a probability map can be generated to estimate the locations of overlying objects.

Particular implementations of the subject matter described in this disclosure can be implemented to realize one or more of the following potential advantages. Unlike capacitive touch systems, which may require skin contact or a similar material, the optical sensing systems described herein do not require specific materials, or even contact with a surface. When IR light is used, the system can be used in conjunction with a display device or other object to be viewed without inhibiting viewing of the device or altering the appearance of the device. The system can detect precise touch input, as well as broad gestures such as hand swipes using the same system and analysis. Because multiple discrete overlying objects can be sensed, the system allows robust multi-touch gesture sensing, such as of more than one finger or stylus.

While the implementations of optical sensing systems described herein need not be used with a display, one particular example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements B are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 μm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
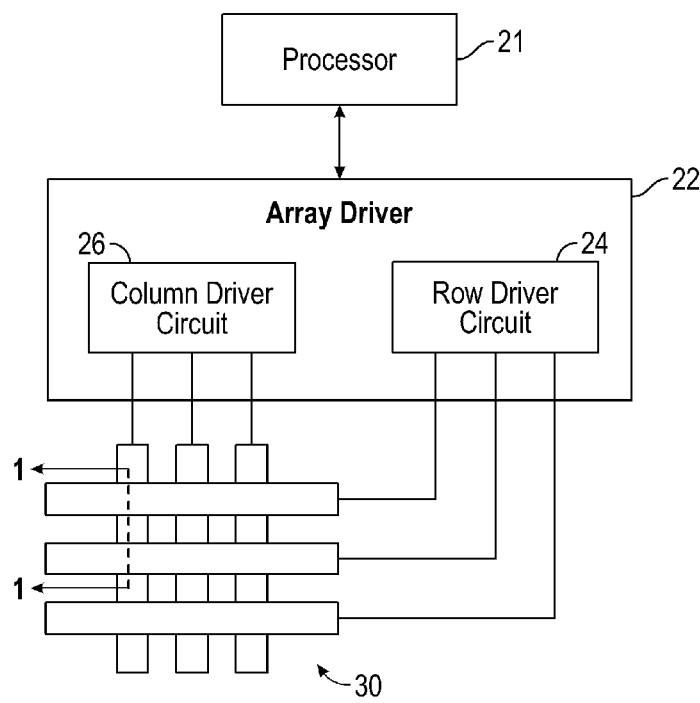
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

In certain implementations, electromechanical system (EMS) devices such as interferometric modulators may be incorporated into display devices or other devices which include supplemental illumination systems for illuminating or supplementing the illumination of a display device. While a reflective display such as an interferometric modulator-based display may in some implementations be visible in ambient light, some particular implementations of reflective displays may include supplemental lighting in the form of a frontlight system, In some implementations, a frontlight system may include one or more light-guiding films or layers through which light can propagate, and one or more light-turning features to direct light out of the light-guiding films. Light can be injected into the light-guiding layer, and light-turning features can be used to reflect light within the light-guiding layer towards the reflective display and back through the light-guiding layer towards a viewer. Until light reaches a light-turning feature, the injected light may propagate within the light guiding layer by means of total internal reflection due to selection of a material for the light-guiding layer which has an index of refraction greater than that of the surrounding layers. Thus, such a frontlight film allows an illuminating light source to be positioned at a location offset from the display itself, such as at one of the edges of the frontlight film.

Figure 3:
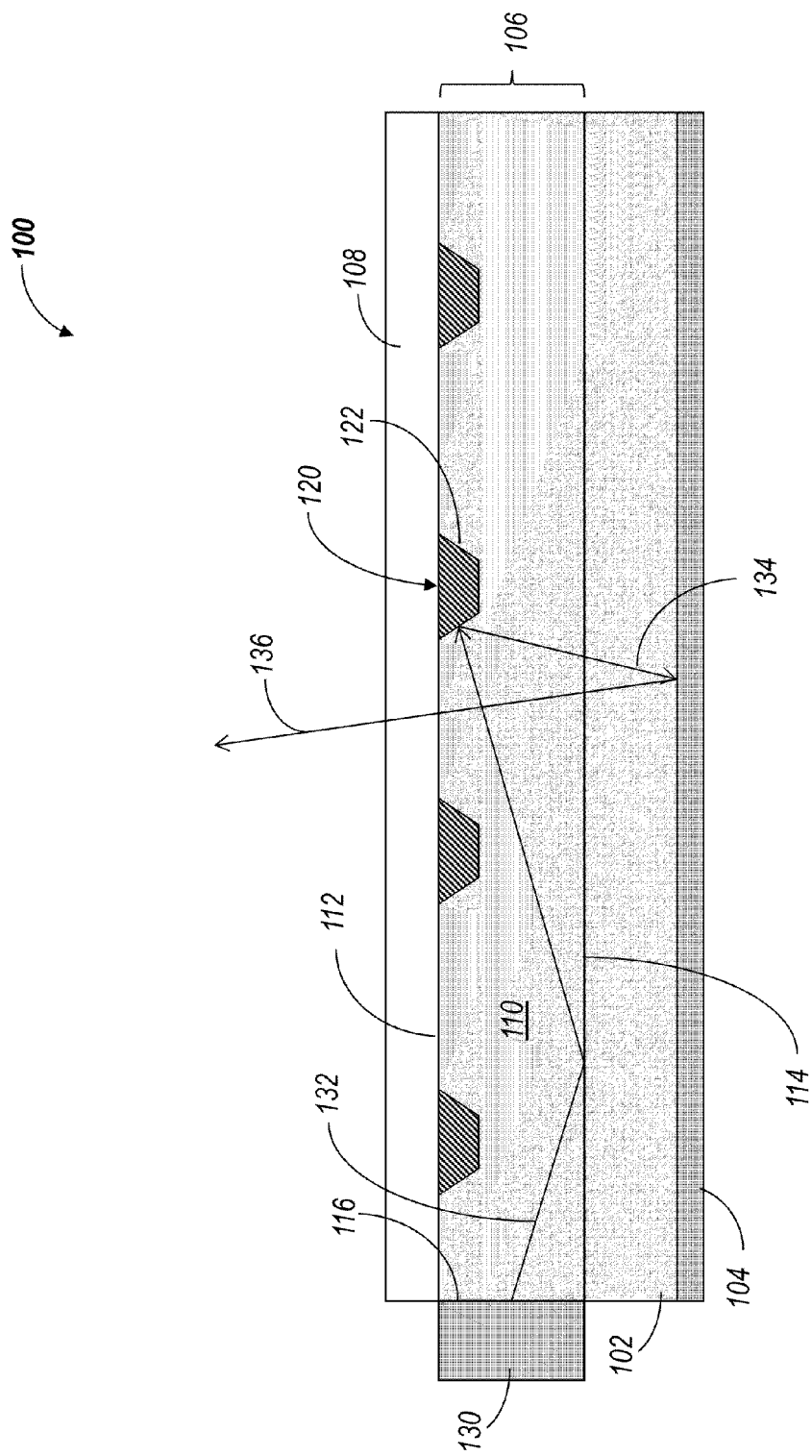
FIG. 3 shows a side cross-section of a cross-sectional view of an example of a display device including a frontlight system to provide supplemental illumination to the display.

FIG. 3 shows a side cross-section of a cross-sectional view of an example of a display device including a frontlight system to provide supplemental illumination to the display. The display device 100 includes a reflective display 104 supported by a substrate 102, and a frontlight system 106 overlying the reflective display 104. A cover layer 108 overlies the frontlight system 106 in the illustrated implementation, although additional structural and adhesive layers, not specifically illustrated in FIG. 3, may also be included in other implementations.

The frontlight system 106 includes a light-guiding layer 110 which may have an index of refraction greater than that of the surrounding layers, as discussed above. The light-guiding layer 110 may also include a plurality of light-turning features 120 disposed along an upper surface 112 of the light guiding layer 110 which include reflective surfaces 122 oriented at an angle to the upper surface 112 and lower surface 114 of light-guiding layer 110. The frontlight system 106 also includes one or more light sources such as LED 130 disposed adjacent an edge 116 of the light-guiding film 110.

The LED 130 injects light 132 into the light-guiding film 110, which propagates by means of total internal reflection as shown until it strikes a light-turning feature 120. The light 134 reflected off the light-turning feature is turned downwards towards the reflective display 104. When the light 134 is reflected at an angle sufficiently close to the normal of the lower surface 114 of light-guiding layer 110, the light 134 passes through the lower surface 114 of light-guiding layer 110 without being reflected back into the light-guiding layer 110. The light 134 travels down to the reflective display 104, and light 136 reflected off the reflective display passes upwards through the substrate 102, frontlight system 106, and cover layer 108 and onward to a viewer (not shown).

The frontlight system 106 thus directs light propagating within the light-guiding layer outward to the reflective display 104. In other implementations, a similar structure can be used to collect light incident upon a display device or other layer and direct the same towards light sensors as part of a sensor system.

Figure 4:
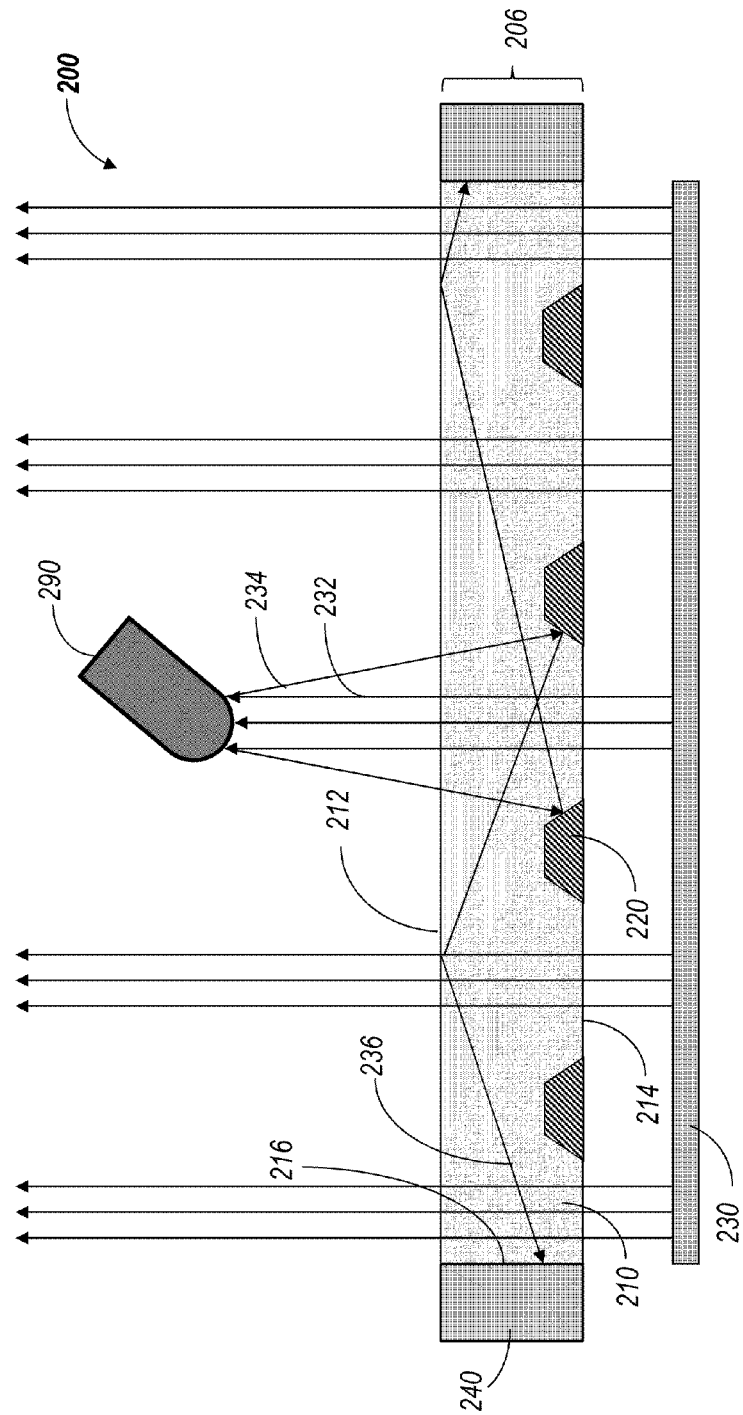
FIG. 4 shows an example of an optical sensor system which can be used to detect one or more overlying objects.

FIG. 4 shows an example of an optical sensor system which can be used to detect one or more overlying objects. The sensor system 200 includes a light source 230 underlying a light-collecting system 206. In some implementations, the light source 230 may include an infrared (IR) light source, such that the emission of light from the light source 230 does not interfere with the appearance of the sensor system 200. In some implementations, the light source 230 can be a planar light source, or otherwise diffuse, such that the light is emitted evenly across the system 200, while in other implementations, not shown, the light source 230 may include one or more discrete light sources such as IR light-emitting diodes (LEDs). The near-field region overlying the system 200 is therefore illuminated with light such as IR light. Although referred to alternately herein as a near-field area, the near-field region has a vertical component as well and includes a volume of space overlying the system 200.

The light-collecting system 206 is similar to the frontlight system 106 of FIG. 3, except that the orientation of the light-turning structures 220 is the opposite of that of the light-turning structures 120 of the frontlight system 106. In particular, the light-turning structures 220 are disposed on the lower surface 214 of the light-guiding layer 210, rather than on the upper surface 212. The light-turning structures 220 are configured to turn incident light towards one or more light sensors 240 located at the edges 216 of the light-guiding layer 210. In some implementations, linear arrays of light sensors 240 are disposed along each edge 216 of the light-guiding layer 210.

Light 232 emitted from light source 230 passes upward through the light-collecting system 206 where it strikes an overlying object 290, which can be, for example, a stylus, or a portion of a user's hand, such as a fingertip. Light 234 reflected off the overlying object 290 is then reflected downward and back into the light-collecting system 206, passing through the upper surface 212 of the light-guiding layer 210, where a portion of the light 234 strikes light-turning structures 220. Light 236 reflected off light-turning structures 220 at a sufficiently shallow angle relative to the upper and lower surfaces 212 and 214 of the light-guiding film 210 will propagate within the light-guiding film 210 until it reaches light sensors 240 disposed along the edges 216 of the light-guiding film 210.

Although schematically illustrated as having light-turning structures 220 which are discretely viewable, the light-collecting system 206 may include a much larger number of very small light turning structures 220, and those light-turning structures may be sufficiently small that they are not individually distinguishable by a viewer. The number, size, and density of these light-turning structures 220 may vary depending on the particular application, as discussed in greater detail below. In addition, although illustrated in FIG. 4 and elsewhere throughout the figures as being generally frustoconical, other shapes of light-turning structures 220 may also be used, including but not limited to conical shapes, square pyramids, or other pyramidal shapes.

Figure 5:
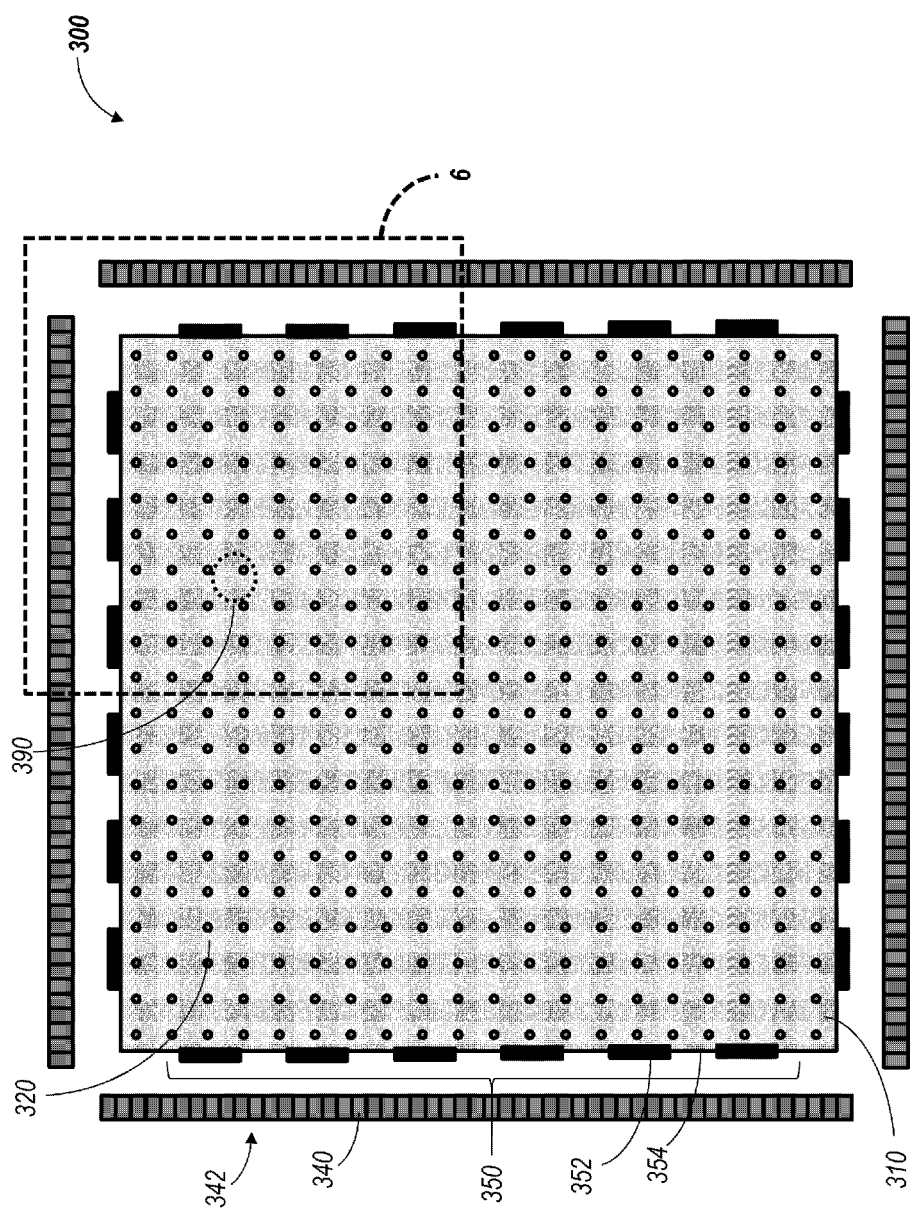
FIG. 5 shows a top plan view of another implementation of an optical sensor system.

FIG. 5 shows a top plan view of another implementation of an optical sensor system. Like the optical sensor system 200 of FIG. 4, the optical sensor system 300 includes a light-guiding film 310 having a plurality of light-turning structures 320 adjacent or extending into the light-guiding film 310, and a plurality of sensor arrays 342 located proximal each edge 316 of the light-guiding film 310. Again, although schematically illustrated as discretely viewable structures in FIG. 5, many implementations will include many more light-turning structures 320 which may be much smaller than the schematic depictions in FIG. 5. A light source (not shown), such as a planar IR light source, may also be included for illuminating the area overlying the optical sensor system 300.

In the illustrated implementation, the sensor arrays 342 include linear arrays of light sensors 340. In particular implementations, these light sensors 340 may be IR sensors, but in other implementations the light sensors 340 may be at least partially sensitive to visible light or other non-IR radiation as well.

The optical sensor system 300 also includes a mask 350 between the light-guiding layer 310 and the sensor arrays 342. In the illustrated implementation, the mask 350 is formed of linear arrays of individual masking structures 352 regularly spaced apart from one another. As discussed in greater detail below, the inclusion of the mask 350 facilitates identification of the location or locations of overlying objects reflecting light back into the light-guiding layer 310.

An object overlying the region 390 will reflect light back towards the array of light-turning features 320, with the areas of the array of light-turning features 320 closest to the region 390 receiving the most reflected light. The light-turning features 320 will then turn a portion of that reflected light into the light-guiding layer 310, and that portion of light will propagate via total internal reflection until it reaches the edge 316 of the light-guiding layer 310. The light-turning structures 320 within or adjacent the region 390 will not only receive a greater intensity of reflected light from the overlying object, but that reflected light will also be incident upon the light-turning structures 320 at an angle which is closer to the normal of the upper and lower surfaces 312 and 314 of the light-turning layer 310. Light incident at an angle closer to normal will be more likely to be turned at an angle at which the turned light will continue to propagate via total internal reflection. While this turned light will propagate in all directions from the various light turning features 320, the combination of these effects will cause more of this turned light to appear to originate from the light turning features 320 within or adjacent the region 390 beneath the overlying object than from the light turning features 320 located away from the region 390.

The light propagating within the light-guiding layer 310 which is not blocked by the masking structures 352 will reach the light sensor arrays 342 and generate signals indicative of the intensity of the light received by each light sensor 340 in the arrays 342. In some implementations, these signals may be combined into a composite signal or plot indicative of the intensity of the received light as a function of position along the length of an array 342.

Because the light incident upon the light sensor arrays 342 will also be a function of ambient conditions, in some implementations the light source may be modulated to compensate or correct for the effects of ambient radiation. For example, an IR light source can be modulated by periodically strobing the IR light source, rather than constantly illuminating the near-field region with IR light. In addition to reducing power consumption, strobing of the IR light source can be used to improve the measurement accuracy and compensate for the effect of ambient IR light. In one implementation, the measurements from the light sensor arrays 342 can be made both when the IR light source is active and illuminating the near-field area and when the IR light source is off and not illuminating the near-field area. If these measurements are made in an alternating manner, the measurement without active IR illumination can be used to provide an indication of the ambient IR radiation and used to correct the measurements made when the IR illumination is active. In doing so, the corrected measurements made when the IR illumination is active can be more reflective of the response to the active IR illumination, and provide a better estimate of the location of any overlying objects. In other implementations, the IR light source may be strobed only to reduce power, and the measurements from the light sensor arrays 342 can be made only when the IR illumination is active.

Figure 6A:
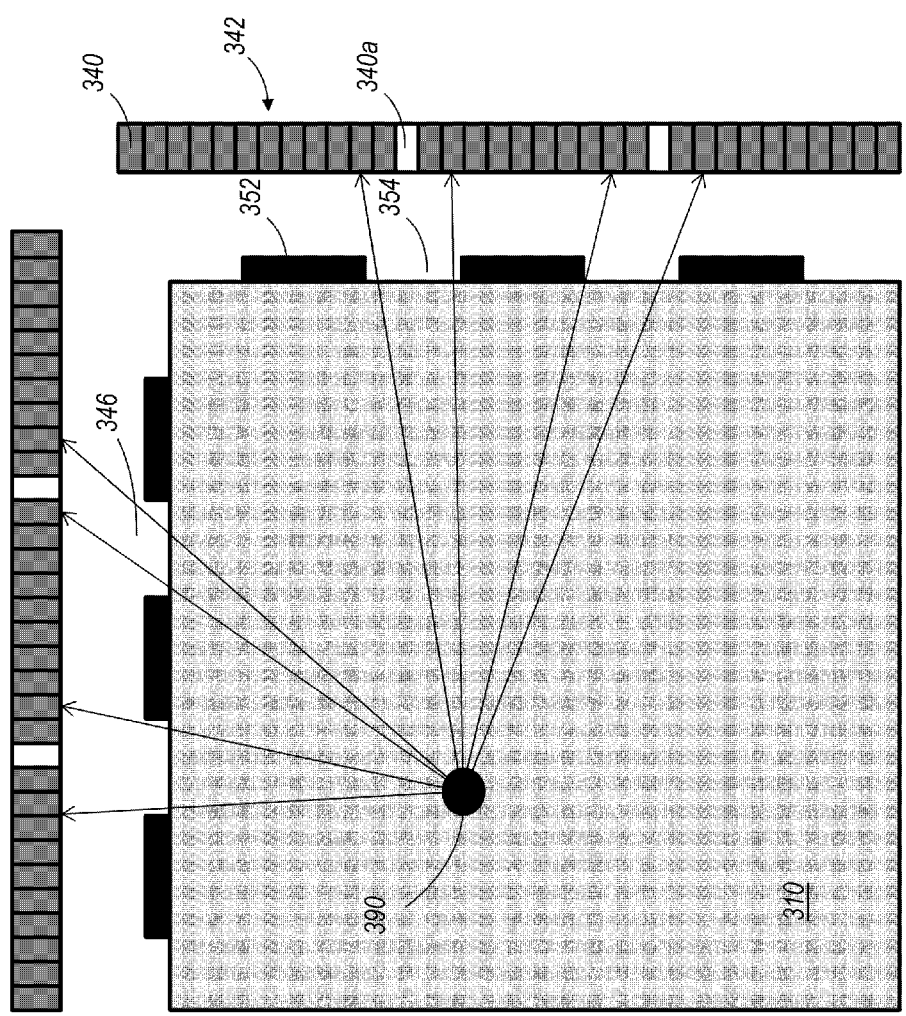
FIG. 6A is a detailed section view of the section 6 of the optical sensor system of FIG. 5.

FIG. 6A is a detailed section view of the section 6 of the optical sensor system of FIG. 5. For the sake of clarity, the individual light-turning structures 320 (see FIG. 5) are not shown in FIG. 6A. As discussed above, the turned light propagating within the light-turning layer 310 will appear to originate primarily from the region 390 underneath an overlying reflective object. The light which reaches the sensor arrays 342 is schematically illustrated as light arcs 346 extending from the region 390. While the amount of light received by the sensors 340 shielded from view of the region 390 by masking structures 352 will not be zero, due to light turned by light-turning features located outside of the region 390 as well as the effects of ambient incident radiation, it will be less than that received by the sensors 340 not shielded from view.

For certain sensors 340a, the light received will be a local maximum, where the light received by the adjacent sensors on either side will be less than the light received by the local maximum sensors 340a. When a single overlying object is reflecting light towards the array of light-turning structures, the number of local maxima may be equal to or less than the number of gaps 354 between masking structures 354, as some local maxima caused by gaps 354 near a corner may fall outside of the sensor array 342.

Figure 6B:
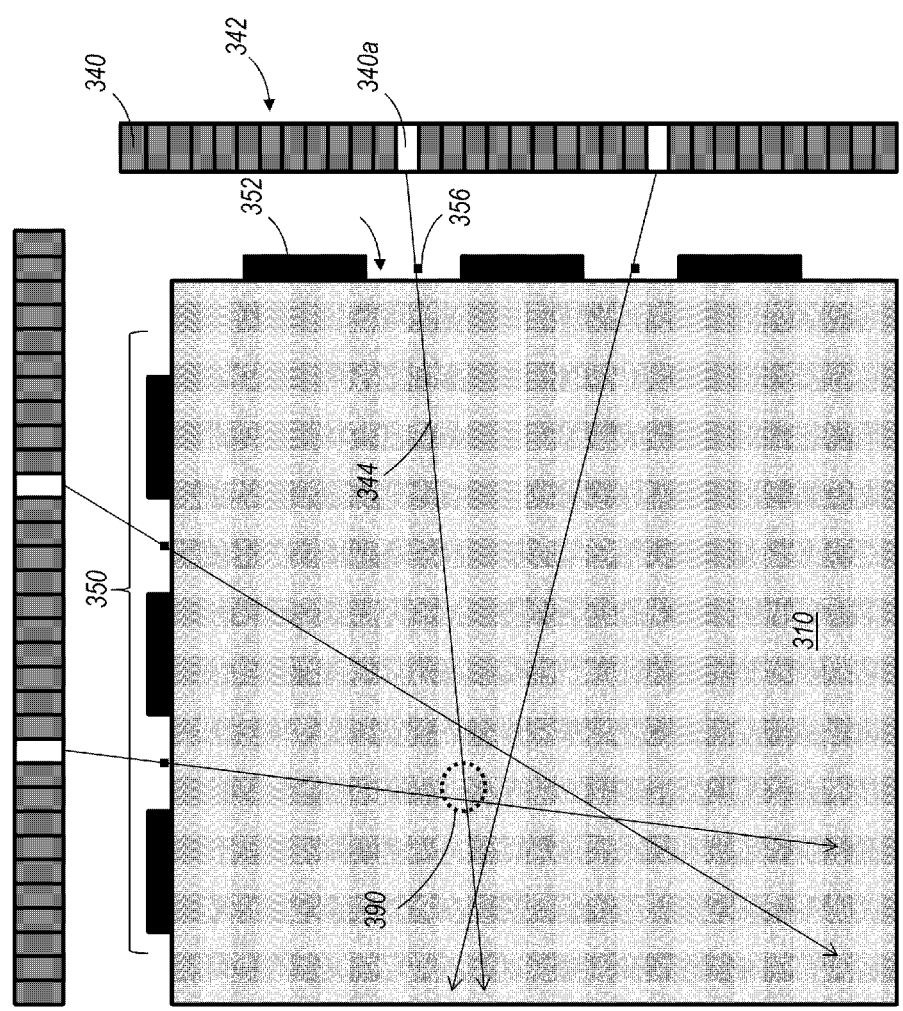
FIG. 6B schematically illustrates one method of estimating a location of an overlying object based on measurements of local maximum amounts of incident light.

FIG. 6B schematically illustrates one method of estimating a location of an overlying object based on measurements of local maximum amounts of incident light. In the illustrated implementation, an indication of the position of the overlying object can be estimated as being along a line 344 extending through the light sensor 340a at which the local maximum is measured and the center 356 of the adjacent gap 354 between masking structures 352. When combined with the estimates drawn from other local maximum sensors 340a, an indication of the location of an overlying object can be provided by the convergence of these lines 344.

The accuracy of this estimate can be increased by increasing the number of sensors 340 within the arrays 342, to more accurately identify the location of the local maximum. In addition, increasing the number of gaps 354 in the mask 350 can increase the number of converging lines, which can in some implementations increase the accuracy of the estimate.

In addition, increasing the offset between the mask 350 and the sensor arrays 342 can in some implementations increase the accuracy of the estimate.

Depending on the offset between the mask 350 and the sensor arrays 342, local maximum sensors 340a may be offset from their associated gap 354 by the length of a gap 354 or more. One method of accounting for this offset is to identify the overall maximum along each sensor array 342 and associate that sensor with the adjacent gap 354, as the overall maximum may correspond to the closest portion on the sensor array 342 to the overlying object. The adjacent local maxima can then be associated with the next adjacent gaps 354, and progress until all of the local maximum sensors 340a have been associated with a respective gap 354 in order.

For the sake of simplicity, the above procedures are described with respect to an implementation in which there is only a single overlying object reflecting light towards the array of light turning structures 320. When multiple overlying objects are reflecting light downward towards the array of light-turning structures, there may be as many local maxima as the number of gaps multiplied by the number of overlying objects, although some of the local maxima resulting from two different overlying objects may overlap or be sufficiently close that they cannot be individually distinguished. Analysis of the number of local maxima and the spacing therebetween can be used to identify the number and location of the overlying objects, as the spacing between local maxima attributable to a particular overlying object will increase with increased distance from the object when a regularly spaced mask 350 is used. This analysis can facilitated by increased resolution of the sensor arrays 342 to better distinguish adjacent local maxima and identify the location of those local maxima with increased precision.

FIG. 7A shows an example of a simulated signal representative of two overlying objects within the near-field area of an optical sensor system. In contrast to the single overlying object 390 of FIGS. 6A and 6B, the simulated signal of FIG. 7A includes two overlying objects 390a and 390b. In some implementations, the overlying objects 390a and 390b may correspond to fingertips of a user, but may include any other object capable of reflecting light, such as IR light, illuminating the near-field region overlying an optical sensor system.

FIG. 7B shows an example of certain light rays turned into a light-guiding layer in response to the simulated signal of FIG. 7A. While only a portion of the light rays are shown in FIG. 7B for the sake of clarity, it can be seen that light reflected by an overlying object 390a and 390b (see FIG. 7A) and turned into a light-guiding layer through the use of light-turning features functions similarly to a light source at locations 394a and 394b (underlying objects 390a and 390b of FIG. 7A, respectively) within the light-guiding layer, spreading light in all directions from those locations 394a and 394b. In other implementations, however, more directional light-turning features may be employed which can constrain the direction in which light is turned into the light-guiding layer. The size of the effective light sources at locations 394a and 394b may increase, and their relative intensity decrease, with increase spacing between the overlying object and the light-guiding layer.

FIG. 7C shows an example of a plot indicative of light intensity along one side of the sensor system in response to the simulated signal of FIG. 7A. In particular, the plot of FIG. 7C illustrates light intensity (or the magnitude of a signal indicative of light intensity) as a function of location along the left side of the optical sensing system illuminated by the simulated signal of FIG. 7A. In the plot of FIG. 7C, location 0 corresponds to the bottom left corner of the optical sensing system and location 1200 corresponds to the top left corner of the optical sensing system, as can be seen in the axis shown on FIG. 7A. The plot of FIG. 7C includes two slightly offset series of intensity peaks corresponding to the local maxima resulting from each of the overlying objects 390a and 390b, as described above with respect to FIG. 6B. The first series of peaks has an overall maximum at 348b, indicating that the overlying object 390b is closer to the sensor measuring overall maximum 348b than to any of the other sensors in the first series of peaks measuring a local maximum. Similarly, the second series of peaks has an overall maximum at 348a, indicating that the overlying object 390a is closer to the sensor measuring overall maximum 348a than to any of the other sensors in the first series of peaks measuring a local maximum.

As can be seen in FIG. 7C, the number of sensors in the sensor array along the left side of the optical sensor system provides sufficient resolution to distinguish between the two sets of peaks corresponding to the light reflected from each of the overlying objects, respectively. Even if there is some peak overlap, measurements may be taken along each side of the optical sensor system, and the signal measured along the opposite side of the system, in this case the right side, may provide additional information not readily available from the measurements taken along the left side of the system. Measurements taken along the top and bottom of the optical sensor system may be similarly analyzed to provide an indication of the location of the overlying objects 390a and 390b along an axis parallel to the top and bottom of the system.

In addition to the overall maximum within a series of local maxima, other analysis may be performed on the measured signals. For example, it can be seen that the overall maximum 348a is larger than the overall maximum 348b, which may indicate that the object 390a is either closer to the left side of the optical sensor system than the object 390b, or closer to the surface of the optical sensor system resulting in increased intensity of reflected light. When the relative intensities along the other sides of the system are compared, along with their estimated locations along an axis parallel to the top or bottom of the display, the relative intensities can be compared to provide an indication of which object 390a or 390b is closer to the surface of the optical sensor system.

In addition, the spacing between the measured peaks may be compared to the known spacing between masking elements to provide an indication of the sources of light incident upon the sensor array, and to identify when multiple peaks from different light sources are too close together to be individually resolved. For example, when the spacing between peaks is roughly the same as the spacing between masking elements, a light source is roughly parallel with that portion of a sensor array, and the spacing will increase with increased distance along the sensor array and away from the light source.

In other implementations, a reconstruction algorithm may be used to analyze the signals received from the sensor array and reconstruct the apparent sources of the turned light. In particular implementations, a probability map can be generated using appropriate sparcity and non-negativity constraints and then analyzed to determine the number of and location of overlying objects.

In addition to providing an estimate of the position or positions of one or more overlying objects, the overall strength of the signals from the light sensors can be used to provide an indication of the distance between the overlying object and the light-guiding layer. In some implementations, the overall maximum intensity alone may not be sufficient to distinguish between a large object at a greater distance from the light-guiding layer 310 and a smaller object closer to the light-guiding layer 310, so the overall intensity can be analyzed in conjunction with other features of the intensity distribution, such as the width of the intensity peaks. For example, a smaller object closer to the light-guiding layer may have narrower intensity peaks than a larger object located at a greater distance from the array, even though the overall intensity may be the same. In a particular implementation, the shape of the intensity distribution may be analyzed to provide an indication of the size of the overlying object, and the overall intensity may then be analyzed to provide an indication of the distance between the overlying object and the light-guiding layer 310.

In further implementations, other types of gestures may be sensed. When a very large object such as an open palm is placed near the light-guiding array, the effect of the mask 350 on the intensity distribution across an array may be minimized due to the diffuse nature of the reflected light. The relative intensity distribution of the array sensors 342 on each side of the array may be analyzed to detect a broad gesture such as a swipe of an open palm or other large object across the display.

Figure 8B:
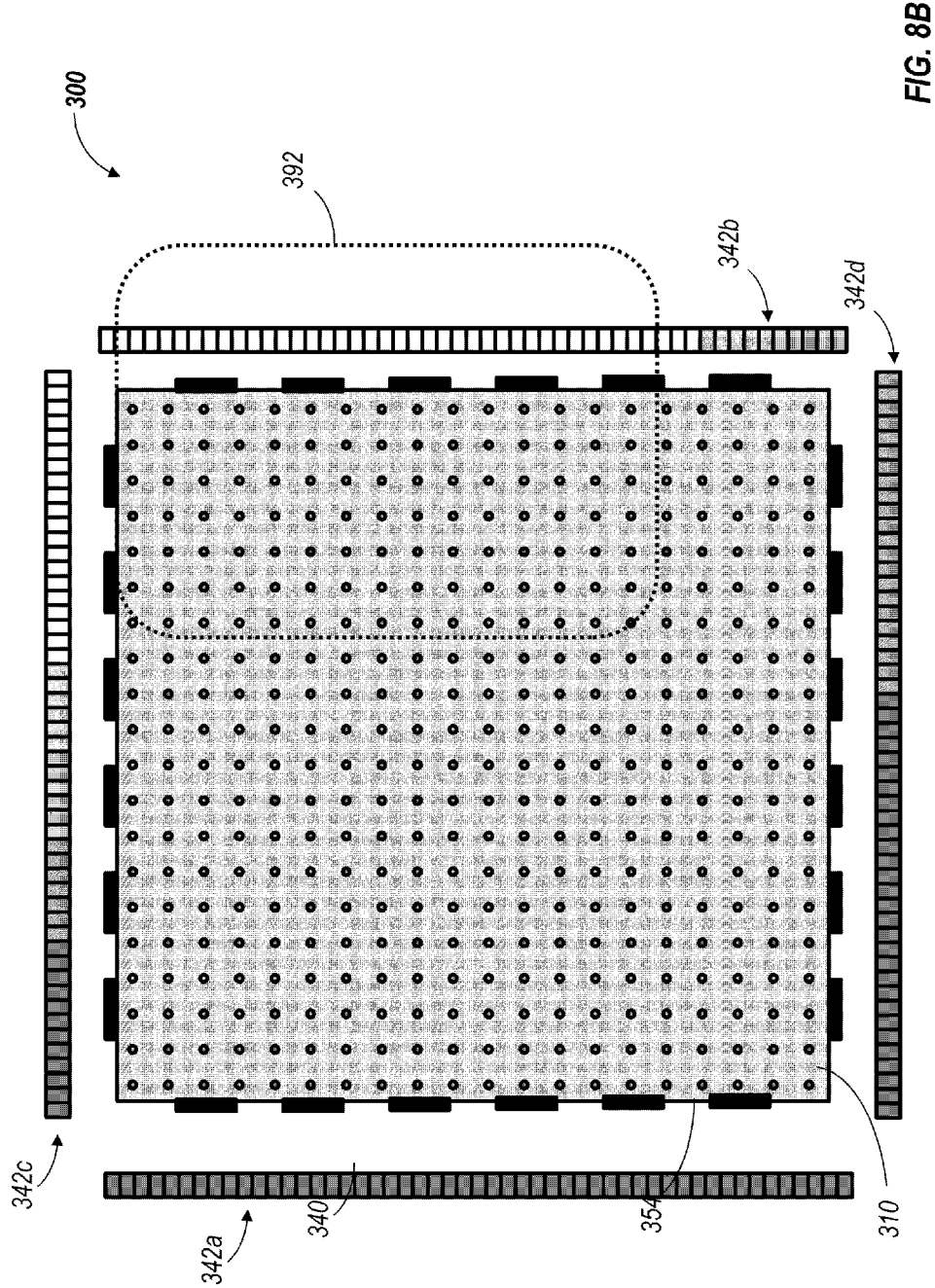

FIGS. 8A and 8B show an implementation of sensing a swipe gesture. In FIG. 8A, an object 392 which is large relative to the scale of the light-guiding layer 310 and masking structures 352 is positioned over the upper left side of the light guiding layer. Because of the diffuse nature of the light reflected by the object 392 and turned into the light-guiding layer 310, the relative variation in the light intensity due to the presence of masking structures 352 between local maxima and minima across portions of light sensor arrays 342a, 342b, 342c, and 342d is less than the variation between local maxima and minima when the object is a smaller object such as a fingertip or stylus.

In the illustrated implementation, the light intensity (as schematically illustrated by the relative darkness of the shading of the sensors 340 within light sensor arrays 342a, 342b, 342c, and 342d) is greater in the upper and left portions of the optical sensing system 300 and is generally more even across the light sensor arrays, although there may still be some peaks and valleys depending on the spacing between the masking structures 354 and the light sensor arrays 342a, 342b, 342c, and 342d. The light intensity is greatest in the portions of the upper light sensor array 342c and left light sensor array 342a underlying or immediately adjacent the object 392, and falls off with increased distance from the object 392.

In FIG. 8B, the object 392 has moved to the right side of the optical sensing system 300 and the light intensity is now greatest in the portions of the upper light sensor array 342c and right light sensor array 342b underlying or immediately adjacent the object 392, falling off with increased distance from the object 392. Thus, the presence of a large object 392 can be detected based on the more even distribution of light intensity across light sensor arrays 342a, 342b, 342c, and 342d. The general position of the large object 392 and broad gestures such as swiping can be detected based on changes in the relative intensity along the edges of the light-guiding layer 310. Similarly, once a large object 392 has been detected, a change in the overall intensity without substantial changes in the relative distribution of the intensity across the various light sensor arrays 342a, 342b, 342c, and 342d can be indicative of movement of the large object 392 towards or away from the light-guiding layer 310.

Although certain of the implementations described above are described with respect to a backlit optical sensing system, in other implementations, the region overlying an optical sensing system may be illuminated from the front or from the side. In a particular implementation in which a device includes an integrated frontlight or other illumination system, the illumination system can be used to provide illumination of the near-field area for the purposes of the optical sensing system.

FIG. 8 shows an example of an optical sensing system used in conjunction with a front-lit device. The device 400 includes a reflective component such as a reflective display 404 underlying a frontlight system 106 such as the frontlight system of FIG. 3. The frontlight system includes a first light-guiding layer 110 including light-turning features 120 configured to turn light 132 emitted from light sources 130 downward and out of the light guiding layer 110.

Disposed on the opposite side of the frontlight system 106 is an optical sensing system 300 which includes a second light-guiding layer 310 and an array of light-turning structures 320 configured to turn light 332 reflected from one or more overlying objects 490 into the light guiding layer 310 where it propagates via total internal reflection until it reaches light sensors 340. To prevent undesired light bleed between the first and second light-guiding layers 110 and 310, at least one intervening layer 460 having a lower index of refraction than the light-guiding layers 110 and 310 can be disposed between the light-guiding layers 110 and 310. Additional shielding (not shown) can be provided, such as the inclusion of opaque or reflective layers at the periphery of the device 400 between the light sources 130 and the light sensors 340.

In some implementations, the device 400 may be a display device incorporating a reflective display, and the optical sensing system may provide a near-field touch and/or gesture sensing system. The frontlight system may include visible light sources for illumination of the display, as well as integrated IR light sources for near-field illumination without interference with the appearance of the display.

Figure 9:
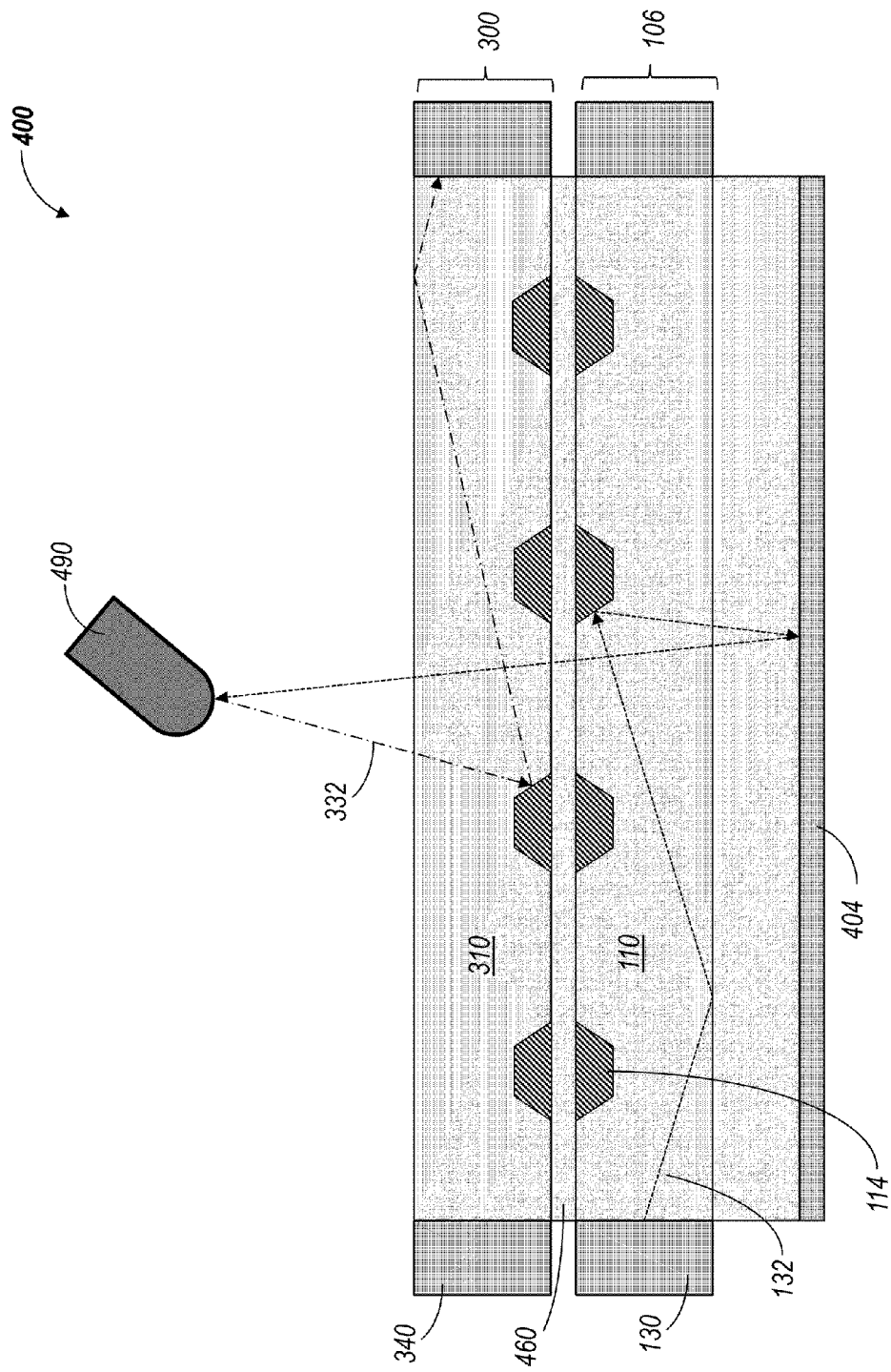
FIG. 9 shows an example of an optical sensing system used in conjunction with a front-lit device.

In other implementations, the device 400 may be any suitable device or object for which touch or gesture sensing may be desired. For example, an optical sensing system such as optical sensing system 300 or other implementations described herein may be integrated into a control panel or switch, such as a dimmer switch, in order to recognize touch and/or gestures. Such a device may either be illuminated from behind, illuminated via a frontlight system such as the frontlight system 106 of FIG. 9, or illuminated through other means, such as via IR LEDs disposed on, near, or otherwise about the device and configured to illuminate the near-field region overlying the device. For example, the device may be a backlit LED or similar display device, and IR light injected into the backlight may pass through the liquid crystal elements without being substantially affected by the state of the liquid crystal elements, allowing even IR illumination of the near-field region without the need for substantial additional components. In other implementations, the device may include other types of displays, whether transmissive, reflective or transflective display, and the light source may be integrated into an suitable illumination system or may be, for example, an IR illumination system separate from an illumination system configured to illuminate the display with visible light. Other potential uses for such an optical sensing system include touch or gesture input devices which need not include an underlying display, such as a drawing tablet, touchpad, or remote controller with touch functionality.

Because implementations of optical sensing systems described herein can sense broad gestures as well as more precise touch input, such a system can be used in implementations where the precision of user input can vary significantly. For example, in-vehicle systems may be controlled both via broad gestures when the vehicle is being operated and the driver's attention is not focused on the system, and via more precise touch input from a passenger when the vehicle is at rest. Both types of input can be provided by a single optical sensing system such as optical sensing system 300.

In addition, because multiple touch and/or gesture inputs can be sensed by implementations of optical sensing systems described herein, such systems allow for both complex multi-touch input and/or gestures, as well as simultaneous input from multiple users. Because the optical sensing systems described herein do not rely on capacitance or other sensing methods which are affected by the physical properties of the object, they can be operated by a user wearing gloves or other protective clothing, and can be used in cold weather or in hazardous environments where skin exposure is undesirable. In addition, such optical sensing systems allow for the sensing of multiple non-touch inputs, such as multiple overlying fingers, without the need for those fingers or other objects to contact a surface of a device or sensing system itself.

The implementations of optical sensing systems described herein are scalable to any suitable size, and can be used in devices as small as or smaller than a watch display, or as large as or larger than a television. In particular implementations in which the near-field area is illuminated throughout the optical sensing system via a planar light source, such as an underling IR light source or a frontlight system configured to emit IR light, the system can be readily scaled to any suitable size, as substantially constant illumination over the entire near-field region can be provided. Other illumination methods can also be scaled to provide large sensing regions.

FIG. 10 shows an example of a flow diagram illustrating a sensing method using a near-field optical sensing system. The method 500 begins at a block 505 where the near-field area overlying an optical sensor system is illuminated with IR light. As discussed above, this area may be illuminated using an IR backlight, a frontlight configured to emit IR, or via IR light sources disposed on or around the optical sensor system. In other implementations, visible light or other radiation may be used in place of IR. This illumination may be constant, or may be pulsed or strobed periodically to minimize the IR output and power draw of the optical sensing system and/or to compensate for ambient IR radiation.

The method 500 then moves to a block 510 where light reflected by one or more overlying objects is sensed by light sensors disposed about the periphery of the optical sensor system. The light reflected is turned towards the light sensors by an array of light-turning structures within or adjacent a light-guiding layer in the optical sensing system. In some implementations, the light sensed by the light sensors passes through a masking structure, such as a series of regularly spaced masking elements, prior to being sensed by the light sensors. In some implementations, the light sensors are linear arrays of light sensors, although other suitable configurations may be used.

Finally, the method 500 moves to a block 515 wherein measured signals from the light sensors are analyzed to identify the location of one or more overlying objects. In some implementations, this analysis may include back projection from local maxima to estimate the location of the overlying objects. In other implementations, the measured signals may be analyzed to generate a probability map identifying the locations of the overlying objects. In other implementations, this analysis may detect a general location or shift in location of an overlying element to identify a gesture such as a palm swiping across the optical sensing system. In other implementations, sensing methods may include additional steps not specifically illustrated in FIG. 10 or described above, or may include fewer steps or combine multiple steps into a single step.

Figure 11A:
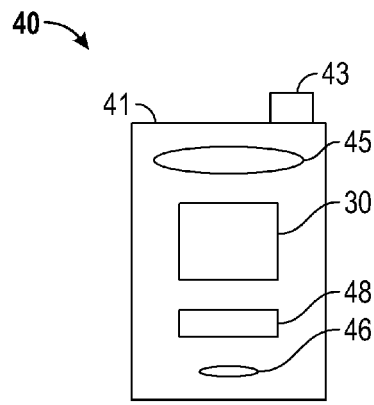
FIGS. 11A and 11B are system block diagrams illustrating a display device that includes a plurality of IMOD display elements.
Figure 11B:
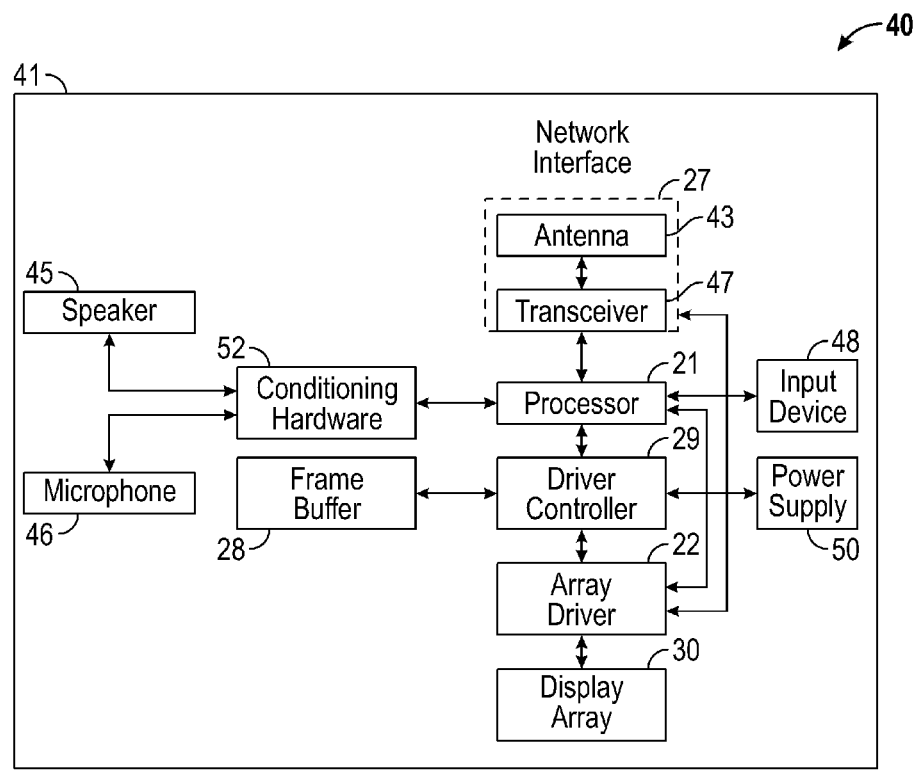

FIGS. 11A and 11B are system block diagrams illustrating a display device 40 that includes a plurality of IMOD display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 10A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 11A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An optical sensing system, comprising:
    a light guiding layer having a first surface, a second surface, and one or more edges;
    an infrared (IR) light source configured to direct light into an area overlying the first surface of the light guiding layer;
    a plurality of light-turning structures configured to redirect light passing through the first surface of the light guiding layer into the light-guiding layer;
    a plurality of IR sensors adjacent at least one edge of the light-guiding layer; and
    a plurality of masking structures disposed between the light-guiding layer and the plurality of IR sensors.

2. The system of claim 1, additionally including a processor in electrical communication with the plurality of IR sensors, wherein the processor is configured to analyze signals measured by the plurality of IR sensors to identify a location of an object within the area overlying the first surface of the light guiding layer.

3. The system of claim 1, wherein the IR light source is configured to modulate the light directed into the area overlying the first surface of the light guiding layer.

4. The system of claim 1, wherein the IR light source is disposed on the same side of the light guiding layer as the second surface, and is configured to direct light through the light guiding layer.

5. The system of claim 1, wherein the IR light source is in optical communication with a second light-guiding layer extending substantially parallel to the first light guiding layer, and wherein the second light-guiding layer includes a plurality of light-turning structures configured to redirect light emitted by the IR light source into the second light-guiding layer into the area overlying the first surface of the first light guiding layer.

6. The system of claim 1, wherein the plurality of IR sensors includes linear arrays of IR photodiodes extending adjacent each edge of the light-guiding layer.

7. The system of claim 1, wherein the plurality of light-turning structures includes reflective facets extending through or adjacent the second surface of the light-guiding layer.

8. The system of claim 1, wherein the plurality of masking structures include a periodic array of masking structures extending adjacent each edge of the light-guiding layer.

9. The system of claim 1, additionally including a display located on the same side of the light guiding layer as the second surface.

10. The system of claim 9, additionally including a backlight disposed on the opposite side of the display as the light-guiding layer, wherein the backlight includes the IR light source.

11. The system of claim 10, wherein the display includes a liquid crystal display.

12. The system of claim 11, additionally including a frontlight system configured to illuminate the display, wherein the frontlight system includes the IR light source.

13. The system of claim 11, wherein the display includes an array of interferometric modulators.

14. The system of claim 9, wherein the display includes a transmissive display.

15. The system of claim 9, wherein the display includes a transflective display.

16. The system of claim 9, wherein the display includes a reflective display.

17. The system of claim 9, additionally including:
a processor that is configured to communicate with the display, the processor being configured to process image data; and
a memory device that is configured to communicate with the processor.

18. The system of claim 17, additionally including:
a driver circuit configured to send at least one signal to the display; and
a controller configured to send at least a portion of the image data to the driver circuit.

19. The system of claim 17, additionally including an image source module configured to send the image data to the processor, wherein the image source module comprises at least one of a receiver, transceiver, and transmitter.

20. The system of claim 17, additionally including an input device configured to receive input data and to communicate the input data to the processor.

21. An optical sensing system, comprising:
a light guiding layer having a first surface, a second surface, and one or more edges;
means for illuminating an area overlying the first surface of the light guiding layer with infrared (IR) light;
a plurality of light-turning structures configured to redirect light passing through the first surface of the light guiding layer into the light-guiding layer;
a plurality of IR sensors adjacent at least one edge of the light-guiding layer; and
a plurality of masking structures disposed between the light-guiding layer and the plurality of IR sensors.

22. The system of claim 21, additionally including a processor in electrical communication with the plurality of IR sensors, wherein the processor is configured to analyze signals measured by the plurality of IR sensors to identify a location of an object within the area overlying the first surface of the light guiding layer.

23. The system of claim 21, wherein the illumination means includes a modulated IR light source.

24. The system of claim 21, wherein the illumination means include an IR light source disposed on the same side of the light guiding layer as the second surface, and is configured to direct light through the light guiding layer.

25. The system of claim 21, wherein the illumination means include:
a second light-guiding layer extending substantially parallel to the first light guiding layer; and
at least one IR light source in optical communication with the second light-guiding layer, wherein the second light-guiding layer includes a plurality of light-turning structures configured to redirect light emitted by the at least one IR source into the area overlying the first surface of the first light guiding layer.

26. A method of sensing one or more objects overlying a light-guiding layer, the method comprising:
illuminating an area overlying a first surface of the light-guiding layer with infrared (IR) light;
redirecting IR light reflected by the one or more overlying objects into the light-guiding layer and towards a plurality of IR light sensors, wherein a masking structure is disposed between the light-guiding layer and the plurality of IR light sensors;
measuring one or more signals indicative of the IR light incident upon the IR light sensors; and
analyzing the measured one or more signals to estimate a location of the one or more overlying objects.

27. The method of claim 26, wherein the masking structure includes a periodic array of masking structures separated by gaps.

28. The method of claim 27, wherein analyzing the measured signals to estimate a location of the one or more overlying objects includes:
identifying a location of a local maximum in the measured one or more signals; and
estimating a location of one of the one or more overlying objects based on a projection extending through the location of the local maximum and a center of one of the gaps.

29. The method of claim 27, wherein analyzing the measured signals to estimate a location of the one or more overlying objects includes generating a probability map of the location of one or more overlying objects.

30. The method of claim 26, wherein illuminating the area overlying a first surface of the light-guiding layer includes illuminating the area with modulated IR light.

* * * * *

UNITED STATES PATENT AND TRADEMARK OFFICE
CERTIFICATE OF CORRECTION

PATENT NO. : 9,109,949 B2  
APPLICATION NO. : 13/829009  
DATED : August 18, 2015  
INVENTOR(S) : Cui et al.

It is certified that error appears in the above-identified patent and that said Letters Patent is hereby corrected as shown below:

In the specification

Column 9 line 32, Change "system," to --system.--.

Column 14 line 58, Change "sparcity" to --sparsity--.

Column 19 line 7, Change "NEV-DO," to --1xEV-DO,--.

Signed and Sealed this  
Third Day of May, 2016

Michelle K. Lee  
*Director of the United States Patent and Trademark Office*